(12) United States Patent
Cheston et al.

(10) Patent No.: US 7,353,428 B2
(45) Date of Patent: Apr. 1, 2008

(54) POLLED AUTOMATIC VIRUS FIX

(75) Inventors: Richard W. Cheston, Morrisville, NC (US); Philip Lee Childs, Raleigh, NC (US); Daryl Carvis Cromer, Apex, NC (US); Mark Charles Davis, Durham, NC (US); Howard Jeffrey Locker, Cary, NC (US); Paul Douglas Plaskonos, Raleigh, NC (US)

(73) Assignee: Lenovo Singapore Pte. Ltd, Singapore (SG)

( * ) Notice: Subject to any disclaimer, the term of this patent is extended or adjusted under 35 U.S.C. 154(b) by 663 days.

(21) Appl. No.: 10/848,796

(22) Filed: May 19, 2004

(65) Prior Publication Data

US 2005/0283640 A1 Dec. 22, 2005

(51) Int. Cl.
*G06F 11/00* (2006.01)
(52) U.S. Cl. .......................... 714/38; 717/168; 726/24
(58) Field of Classification Search ................ 714/38; 717/168; 726/24
See application file for complete search history.

(56) References Cited

U.S. PATENT DOCUMENTS

| | | | |
|---|---|---|---|
| 6,269,456 B1 * | 7/2001 | Hodges et al. ............. | 714/38 |
| 2003/0041130 A1 * | 2/2003 | Harrisville-Wolff et al. ............. | 709/221 |
| 2003/0126468 A1 * | 7/2003 | Markham ................ | 713/201 |
| 2005/0131997 A1 * | 6/2005 | Lewis et al. ............. | 709/203 |
| 2005/0138159 A1 * | 6/2005 | Challener et al. ......... | 709/223 |
| 2005/0216759 A1 * | 9/2005 | Rothman et al. ......... | 713/200 |

* cited by examiner

*Primary Examiner*—Emerson Puente
(74) *Attorney, Agent, or Firm*—Winstead P.C.; Carlos Munoz-Bustamante

(57) ABSTRACT

A client computer is connected via a network to an anti-virus server and polls the server for indication that an anti-virus needs to be immediately downloaded from the anti-virus server. The client computer disengages from the network, and re-establishes a link with only the trusted anti-virus server. The anti-virus fix is installed, the client computer re-booted, and the client computer is then allowed to reconnect to the full network. If the client's primary operating system (OS) is infected, a secondary OS in the client computer performs the anti-virus download and execution. The disengagement from the network is performed by applying a filter in a network interface card (NIC) driver by the primary OS, the secondary OS, a service processor (SP), or by a virtual machine manager (VMM), depending on which is available at the client computer.

16 Claims, 9 Drawing Sheets

POLLED AUTOMATIC VIRUS FIX

BACKGROUND OF THE INVENTION

This invention relates generally to network computing systems, and in particular to remotely managed computers. Still more particularly, the present invention relates to a method and system for dynamically repairing or immunizing a client computer from a computer virus. The invention forces the client computer to contact only a pre-authorized anti-virus server to receive an anti-virus fix for the computer virus under various modalities.

One area of background entails virtual machines and virtual machine monitors which arose out of the need to run applications written for different operating systems concurrently on a common hardware platform, or for the full utilization of available hardware resources. Virtual machine monitors were the subject of research since the late 1960's and came to be known as the "Virtual Machine Monitor" (VMM). Persons of ordinary skill in the art are urged to refer to, for example, R. P. Goldberg, "Survey of Virtual Machine Research," IEEE Computer, Vol. 7, No. 6, 1974. During the 1970's, as a further example, International Business Machines Corporation adopted a virtual machine monitor for use in its VM/370 system.

A virtual machine monitor, sometimes referred to in the literature as the "hypervisor," is a thin piece of software that runs directly on top of the hardware and virtualizes all the hardware resources of the machine. Since the virtual machine monitor's interface is the same as the hardware interface of the machine, an operating system cannot determine the presence of the VMM. Consequently, when the hardware interface is one-for-one compatible with the underlying hardware, the same operating system can run either on top of the virtual machine monitor or on top of the raw hardware. It is then possible to run multiple instances of operating systems or merely instances of operating system kernels if only a small subset of system resources are needed. Each instance is referred to as a virtual machine. The operating system can be replicated across virtual machines or distinctively different operating systems can be used for each virtual machine. In any case, the virtual machines are entirely autonomous and depend on the virtual machine monitor for access to the hardware resources such as hardware interrupts.

Another area of background involves viruses. While early computers were "stand alone" and unable to communicate with other computers, most computers today are able to communicate with other computers for a variety of purposes, including sharing data, e-mailing, downloading programs, coordinating operations, etc. This communication is achieved by logging onto a Local Area Network (LAN) or a Wide Area Network (WAN). While this expanded horizon has obvious benefits, it comes at the cost of increased exposure to mischief, particularly from viruses.

A virus is programming code that, analogous to its biological counterpart, usually infects an otherwise healthy piece of code. The virus causes an undesirable event, such as causing the infected computer to work inefficiently, or else fail completely. Another insidious feature of many viruses is their ability to propagate onto other computers on the network.

The four main classes of viruses are file infectors, system (or boot-record) infectors, worms and macro viruses. A file infector attaches itself to a program file. When the program is loaded, the virus is loaded as well, allowing the virus to execute its mischief. A system infector infects a master boot record in a hard disk. Such infection will often make the hard drive inoperable upon a subsequent re-boot, making it impossible to boot-up the computer. A worm virus consumes memory or network bandwidth, thus causing a computer to be non-responsive. A macro virus is among the most common viruses, and infects word processor programs.

Another common type of virus is aimed at browsers and e-mail. One such virus causes a Denial of Service (DoS) attack. A DoS virus causes a website to become unable to accept visitors. Usually, such attacks cause the buffer of the website to overflow, as a result of millions of infected computers being forced (unwittingly) to hit the website.

To counter viruses, anti-viral programs are written, and are constantly updated to be effective against new viruses. Such anti-viral programs are delivered either on physical media (such as CD-ROMs), or are downloaded off a network such as the Internet. Updates are typically downloaded as well, in order to provide rapid deployment of such updates. Such updates have problems and limitations, however. The most significant limitation is that such an update may not be downloadable if the client computer is already infected. That is, if the client computer has already been infected with a virus such as a system infector, then the computer will be completely unable to boot from its primary operating system, much less download an anti-viral program. Similarly, if the client computer is already infected with a worm virus, then the client computer will be non-responsive and unable to download the anti-viral program.

Another limitation is that the client computer is exposed to the network while downloading the anti-viral program. In the case of rapidly spreading viruses, this exposure can be critical, causing the client computer to be infected while looking for and/or downloading the necessary anti-viral program.

Another limitation is that downloading a software fix from an anti-viral program server requires user intervention or user action, such as accepting the download, selecting a drive and location to store the download, running the fix, often re-booting the computer after running the fix, et al. Many times the end user of the client computer will ignore a prompt or offer to download a fix, or will fail to manually perform an update check, thus leaving infected clients on a network, thus causing other client computers on the network to become infected.

SUMMARY OF THE INVENTION

What is needed, therefore, is a method and system that permits a client computer to receive a software fix, e.g., an anti-viral program, even if the client computer is already infected, and to have the fix automatically installed without requiring any end-user action. Preferably, such a method and system limits network communication to that between the client computer and a pre-authorized anti-virus program server.

As will be seen, the foregoing invention satisfies the foregoing needs and accomplishes additional objectives. Briefly described, the present invention provides a method and system for downloading software fixes such as anti-virus programs onto a client computer.

A client computer is connected via a network that contains an anti-virus server (or more generally, a software-fix server). The client polls the anti-virus server and determines if an available anti-virus or software fix has not been previously received on the client computer. The client computer disengages from the network, and re-establishes a link with only the trusted anti-virus server. The anti-virus or software fix is installed, the client computer re-booted, and the client computer is then allowed to reconnect to the full network. If the client's primary operating system (OS) is infected, a secondary OS in the client computer performs the anti-virus download and execution. The disengagement from the network is performed by applying a filter in a network interface card (NIC) driver by the primary OS, the secondary OS, a service processor (SP) in the client computer, or by a virtual machine monitor.

BRIEF DESCRIPTION OF THE DRAWINGS

The novel features believed characteristic of the invention are set forth in the appended claims. The invention itself, however, as well as the preferred modes of use, further purposes and advantages thereof, will best be understood by reference to the following detailed description of an illustrative embodiment when read in conjunction with the accompanying drawings, wherein:

DETAILED DESCRIPTION OF THE ILLUSTRATIVE EMBODIMENTS

Figure 1:
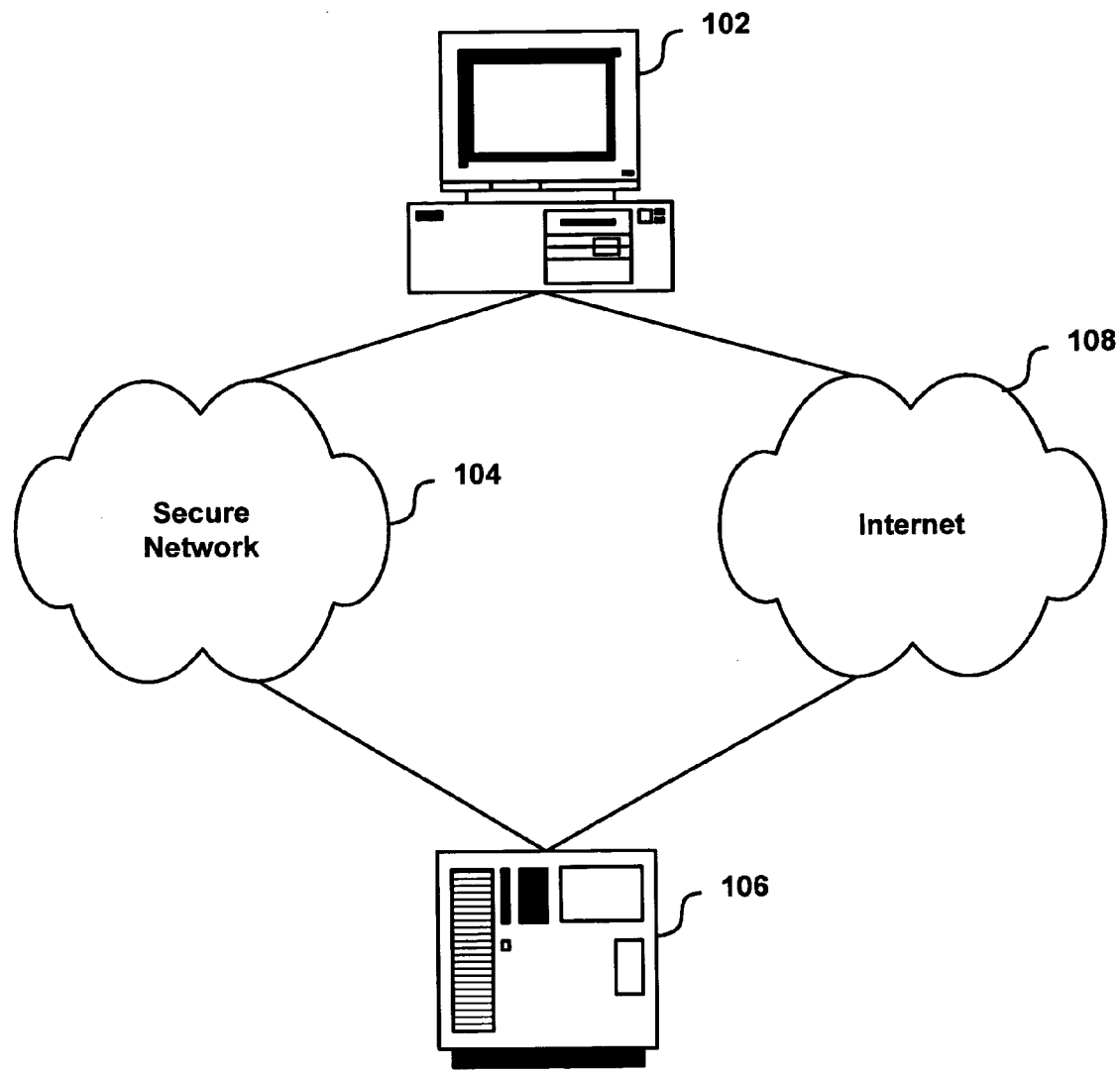
FIG. 1 depicts a schematic diagram illustrating a computer network within which the present invention may be used.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Referring now to the drawing figures, in which like numerals indicate like elements or steps throughout the several views, a preferred embodiment of the present invention will be described. In general, the present invention provides an improved method and system for downloading anti-viruses.

With reference now to FIG. 1, there is depicted an exemplary diagram of a client computer 102 coupled to a secure network 104, which is coupled to a fix server 106. In one embodiment, communication between client computer 102 and fix server 106 may be via an insecure network, such as the Internet 108.

Fix server 106 is capable of delivering (downloading) software fixes, such as patches, anti-viruses, etc. For purposes of clarity and simplicity, these software fixes will usually be referred to as "anti-viruses," although it is understood to be within the scope of the present invention that any software fix used to correct a defect in software, including a virus, an outdated version, a locked system, a "bug," etc., is within the scope and vision of the present invention. Additional details of client computer 102 and fix server 106 are given below.

Figure 2:
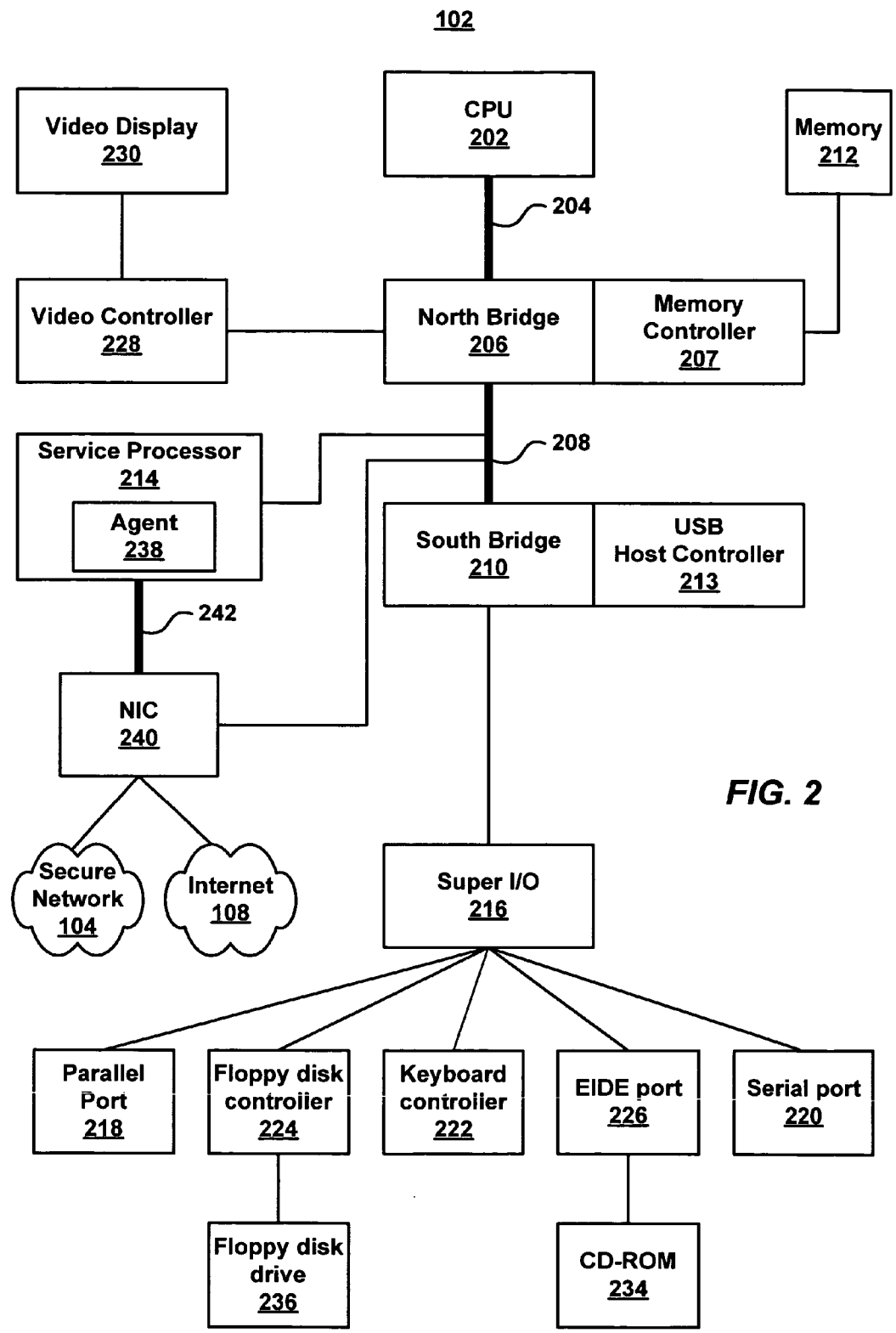
FIG. 2 illustrates an exemplary client computer that needs an anti-virus.

With reference now to FIG. 2, additional detail of client computer 102 is given. A Central Processing Unit (CPU) 202 connects via a processor interface bus 204 (also referred to in the art as a "front side bus," "host bus," or "system bus") to a North Bridge 206. North Bridge 206 is a chip or chipset arbiter logic circuit having a memory controller 207 connected to a system memory 212. A video controller 228 is coupled to North Bridge 206 and a video display 230 for viewing a graphical user interface of software operations being performed on client computer 102 by remote fix server 106. Also connected to North Bridge 206 is a high speed interconnect bus 208. North Bridge 206 is connected via interconnect bus 208, which may be a Peripheral Component Interconnect (PCI) bus, to a South Bridge 210.

South Bridge 210 is a chip or chipset Input/Output (I/O) arbiter that includes the necessary interface logic to convey signals from interconnect bus 208 to (typically slower) I/O interfaces, including a Super I/O 216. Super I/O 216 is preferably a chip or chipset including necessary logic and interfaces for a parallel port 218 and a non-USB (Universal Serial Bus) serial port 220, as are understood in the art of computer architecture. Super I/O 216 may also include controllers for non-USB devices such as a keyboard controller 222 for a non-USB keyboard and an Enhanced Integrated Device Electronics (EIDE) port 226, to which is connected to one or more Compact Disk—Read Only Memory (CD-ROM) drives 234. Also connected to Super I/O 216 is a floppy disk controller 224. Floppy disk controller 224 supports an interface with one or more floppy disk drives 236.

Coupled with South Bridge 210 is a USB host controller 213, which provides a USB interface from USB compliant devices (not shown) to client computer 102, including CPU 202. USB compliant devices may be floppy disk drives, CD-ROM drives, keyboards and other peripheral devices that are configured to comply with the "Universal Serial Bus Specification" release 2.0, Apr. 27, 2000 (USB.org), which release or later is herein incorporated by reference in its entirety. USB host controller 213, which is likewise USB compliant, may be implemented in a combination of hardware, firmware and/or software.

Communication between client computer 102 and outside networks, such as secure network 104 or non-secure Internet 108, is via a Network Interface Card (NIC) 240, which is connected to South Bridge 210 via interconnect (PCI) bus 208. Alternatively, NIC 240 is connected via a system management bus 242 to a Service Processor (SP) 214, which is connected to interconnect bus 208. SP 214 is a specialized hardware processor that can be used to configure NIC drivers for NIC 240, as described in greater detail below.

Within SP 214 is an agent 238. Agent 238 is a software program that performs a variety of tasks related to downloading anti-viruses, as described in further detail. While agent 238 is depicted as being integral with SP 214, agent 238 may alternately be stored in memory 212 or any other storage area accessible to client computer 102, particularly if client computer 102 does not have an SP 214. As will be described, Agent 238 can also be implemented entirely in hardware or partially in hardware and partially in software. Additionally, Agent 238, as described in further detail, can run as a part of a virtual machine monitor. Agent 238, in its many forms, is also known the Antidote Agent or as Antidote.

Figure 3:
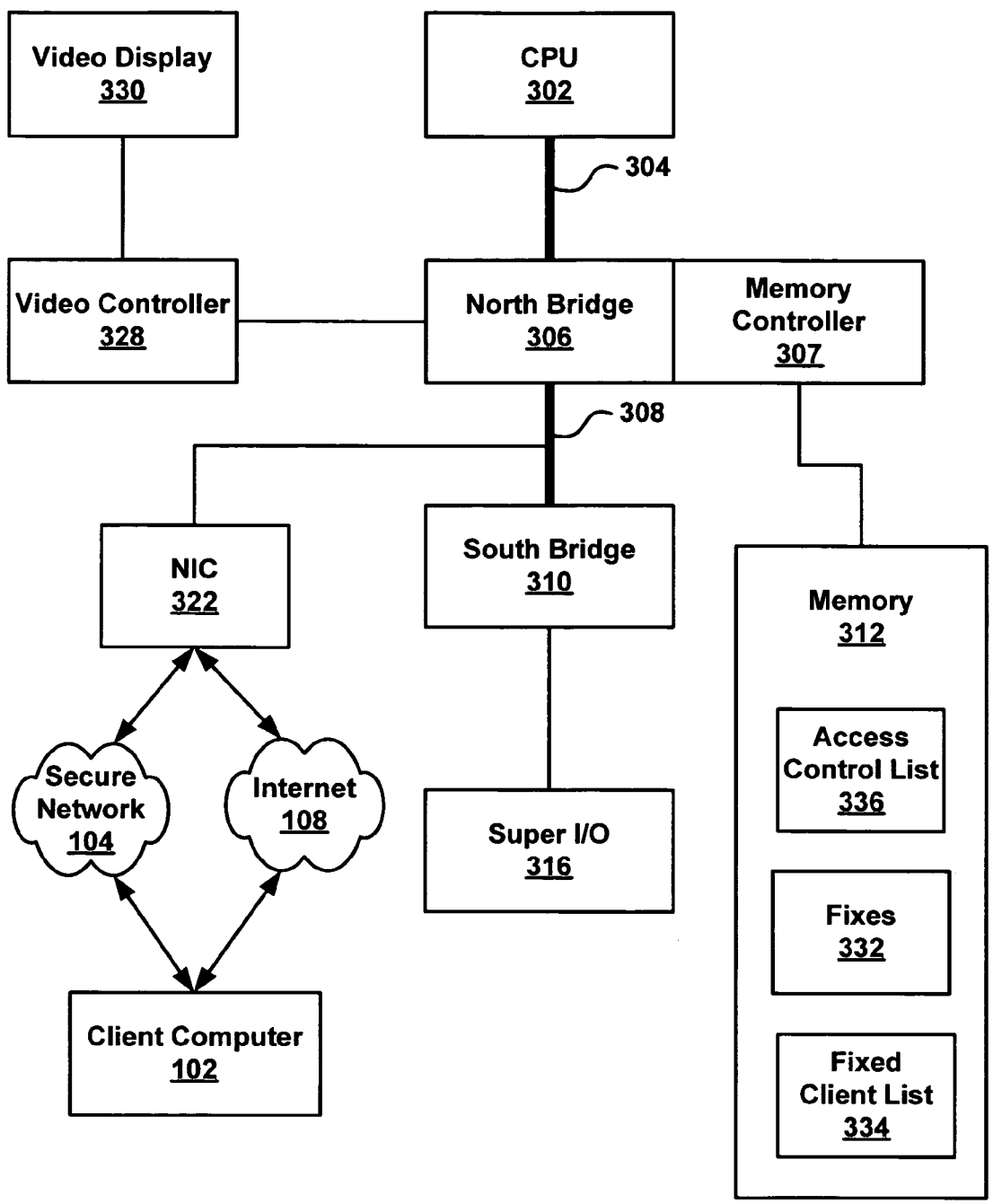
FIG. 3 depicts an exemplary fix server that supplies the anti-virus to the client computer.

With reference now to FIG. 3, there is depicted a block diagram of an exemplary fix server 106. A Central Processing Unit (CPU) 302 connects via a processor interface bus 304 (also referred to in the art as a "front side bus," "host bus," or "system bus") to a North Bridge 306. North Bridge 306 has a memory controller 307 connected to a system memory 312. Stored within system memory 312 are access control list 336, which is used for client authentication for access to server 106, and fixes 332, which may be any type of software fixes, including anti-virus programs, program "patches," program updates, etc. Also stored within system memory 312 is a fixed (i.e., "repaired," "updated," etc.) client list 334, which contains a listing of all client computers under fix server's 106 authority that have (or have not) received a fix stored and listed in fixes 332.

Also connected to North Bridge 306 is a high speed interconnect bus 308. Also connected to North Bridge 306 is a video controller 328, which drives a video display 330.

North Bridge 306 is connected via interconnect bus 308, which may be a Peripheral Component Interconnect (PCI) bus, to a South Bridge 310. South Bridge 310 includes the necessary interface logic to convey signals from interconnect bus 308 to a Super I/O 316. Connected to Super I/O 316 may be the types of peripherals described above with regard to Super I/O 216 in FIG. 2. Connected to interconnect bus 308 is a Network Interface Card (NIC) 322, which provides an interface, via either secure network 104 or the Internet 108, with client computer 102.

Note that the exemplary embodiments shown in FIGS. 2 and 3 are provided solely for the purposes of explaining the invention and those skilled in the art will recognize that numerous variations are possible, both in form and function. All such variations are believed to be within the spirit and scope of the present invention anti-virus. Agent 238 executed from the client computer polls the fix server 106 according to a predetermined policy (block 415). Preferably, the policy includes polling the server as the client boots prior to passing control to applications and polling the server at predetermined intervals throughout the day. As part of the polling process (block 415), agent 238 preferably engages an authentication process with the server 106. In one embodiment, server 106 checks the access control list 336 and allows access to the fixes only if the client represented by agent 238 is listed in access control list 336. Server 106 may require further authentication using one of the well known authentication methods. Next, agent 238 determines whether a fix (anti-virus) is needed (block 417) by querying server 106. Server 106 maintains fixed client list 334, and "knows" that the client computer has not received the fix. Preferably, in response to a query by agent 238, server 106 informs agent 238 if a fix is needed and provides the fix—if needed—as a download specifically for client 102. In one embodiment, server 106 predetermines which clients in client list 334 require a fix and provides client specific fixes and messages in area 332 of memory 312 and provides agent 238 with direct access to the fixes 332. The downloaded fix itself may include a protocol or policy for administering the fix and/or an order in which the fix is installed if the fix contains more than one file to be installed or action to be performed (windows registry entry etc.). Agent 238 informs the user of the client computer that an imminent re-boot is about to occur, in order to force the downloading of an anti-virus (block 420). The agent then disengages the client computer from the network (block 422), permitting the NIC to communicate with only the fix server. The agent fetches the anti-virus (fix) from the fix computer and installs it (block 424). The agent then re-boots the client computer, applying the changes prompted by the anti-virus fix (block 426), and the client computer is put back on line with the entire network (blocks 428 and 430).

Client 102 is pre-configured with the network address of the pre-authorized fix server 106. The client's polling 415 is directed at only the pre-authorized fix server 106. In one embodiment, various servers can be provided throughout an installation to share the download bandwidth. In this embodiment, clients in different areas can be pre-configured with the addresses of the various pre-authorized fix servers. Clients can also be pre-configured with various pre-authorized-fix-server addresses to obtain the increased accessability that redundancy provides.

Optionally, clients 102 and servers 106 can be configured to pace the installation of the fixes 332. Client areas can be given an identifier for controlling the policy for polling 415. For example, update all clients having a "Marketing" identifier first then clients having a "Development" identifier, etc.

In the preferred embodiment, disengagement of the client computer from the network (block 422), is performed by agent 238 which includes instructions to apply a filter to the NIC drivers in the client computer allowing the NIC to communicate only with the pre-authorized fix server. The client computer then receives and applies (installs and runs) the fix (block 424). The client computer is then rebooted without the NIC driver filter, allowing the client computer 102 to communicate with any other resource on the network.

Figure 4:
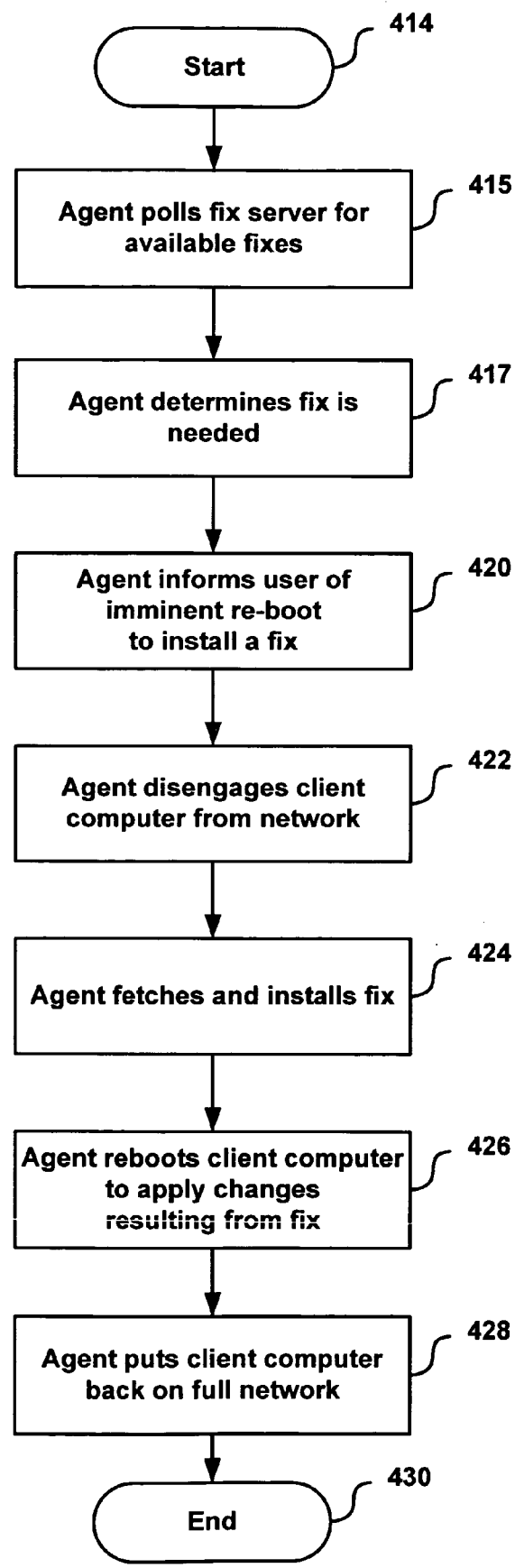
FIG. 4 is a flow-chart of steps taken to download the anti-virus using the primary OS to reconfigure the NIC driver.

While the process described in FIG. 4 is usually effective, there may be occasions in which the primary OS has been corrupted to the point of being inoperable or non-responsive. The method depicted in FIG. 5 addresses this situation.

In the embodiment that follows, the client computer pre-boots from an alternate OS, if present, in the client computer, rather than the client computer's primary OS. (If an alternate OS is not present, then the client computer receives the anti-virus fix as described in FIG. 4.) This pre-boot operation identifies what anti-virus action is required according to the anti-virus action dictated by the fix server.

The pre-boot configures the pre-boot NIC driver to communicate only with the fix server. The secondary OS's pre-boot fetches the anti-virus fix from the fix server, and stages fixes an installs changes (e.g., new drivers, flags, settings, etc.) in the primary OS. That is, the pre-boot of the secondary OS repairs the primary OS while the primary OS is inactive. The pre-boot of the secondary OS then reboots the primary OS, and the primary OS completes available changes (new drivers, flags, settings, etc.) according to the anti-virus instructions. The primary OS then fully boots up the client computer, including setting the NIC driver to allow unfettered communication with any computer on the network.

Figure 5:
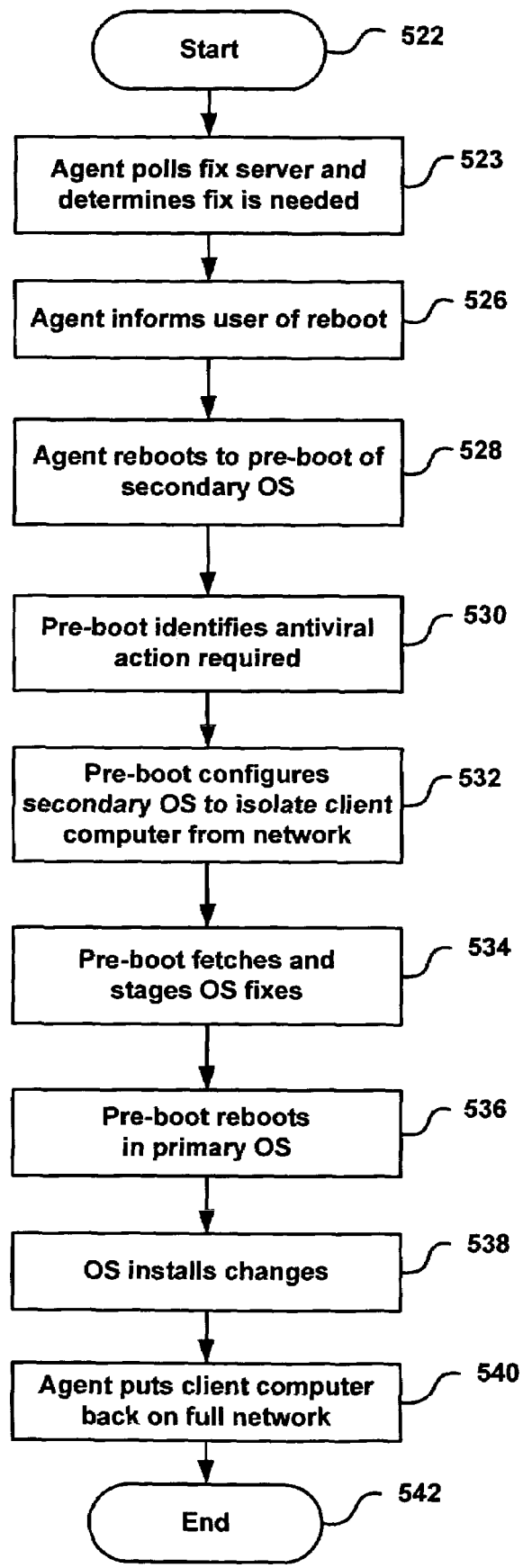
FIG. 5 is a flow-chart of steps taken to download the anti-virus using the secondary OS to reconfigure the NIC driver.

FIG. 5 is a flow-chart of steps taken to download the anti-virus fix using the secondary OS to reconfigure the NIC driver. Initially (block 522), agent 238 polls fix server 106 and determines when a fix is needed as described above in FIG. 4 with respect to blocks 415 and 417 (block 523). Upon making the determination that a fix is needed, the client computer's agent 238 informs a user of the client computer that a re-boot is imminent (block 526), allowing the user to shut down the computer, or else be aware that the client computer will automatically shut down (after saving data, settings, etc.). The client computer's agent program then reboots to the pre-boot of the secondary OS (block 528). The pre-boot receives the anti-virus and identifies what action is required by the anti-viral instructions (block 530).

The pre-boot configures the secondary OS to isolate the client computer from the network by resetting the NIC drivers in a manner that only the fix server can be contacted (block 532). The NIC the fetches the anti-virus from the fix server, and makes appropriates staging and changes installation in the primary OS (block 534). The pre-boot of the secondary OS then reboots in the primary OS (block 536), the primary OS installs requisite changes, if necessary, according to the downloaded anti-virus (block 538), and the agent then puts the client computer back on the full network by re-setting the NIC drivers (blocks 540 and 542).

Figure 6:
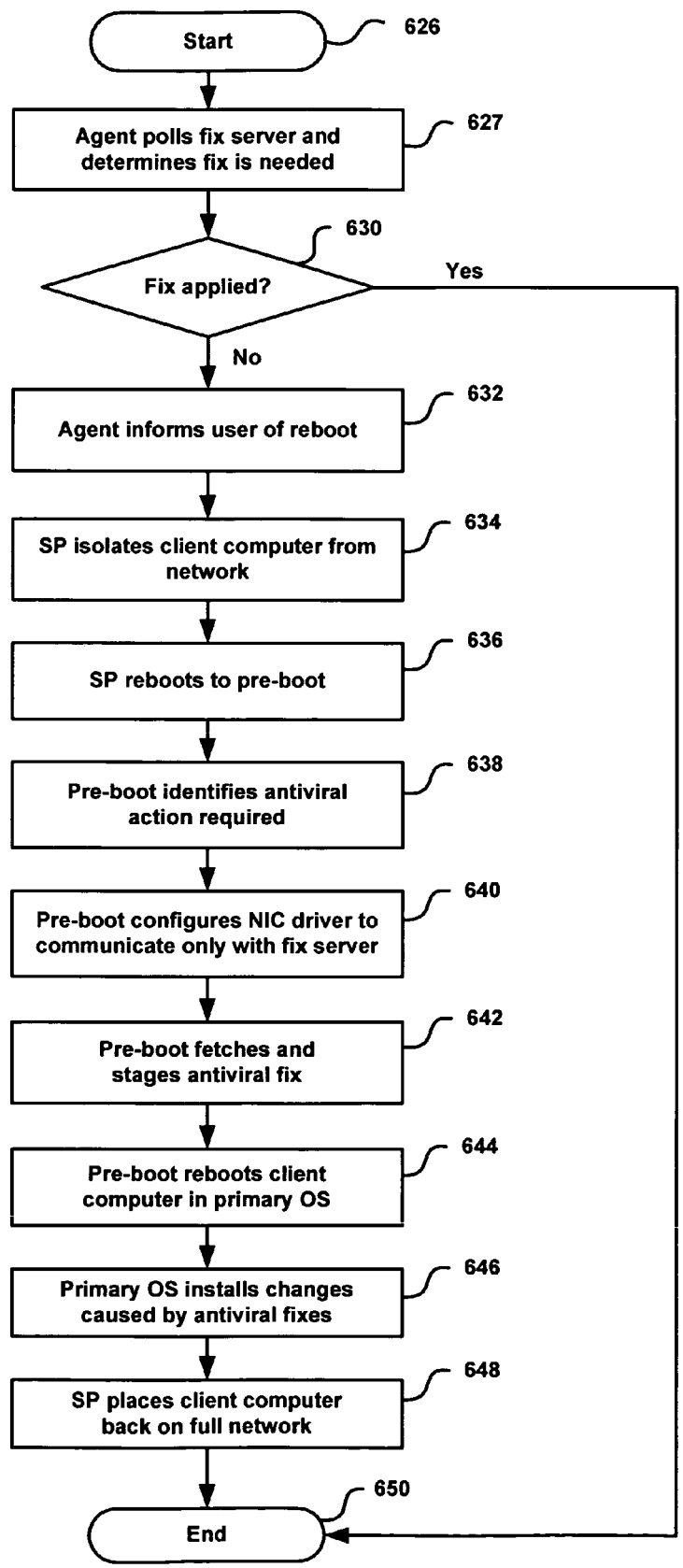
FIG. 6 is a flow-chart of steps taken to download the anti-virus using the SP to reconfigure the NIC driver.

The two methods above have a limitation that there may be occasions in which the primary and secondary OS are both corrupted by the virus. Such a situation is addressed by the process described in FIG. 6. In the embodiment of FIG. 6, a service processor (SP) in the client computer, described above in FIG. 2 item 214, queries software and memory in client computer 102 to see if the client computer has already installed a downloaded anti-virus. If not, the SP executes the agent 238 instructions to isolate the client computer from the network. The SP then boots the pre-boot of the primary OS with instructions pre-stored in the SP, and identifies antiviral actions required by the instructions.

The SP then resets the NIC drivers to communicate only with the fix server. That is, the SP performs the NIC driver setting operation that was performed by the OS's described in FIGS. 4 and 5, but with the use of hardware only, which is impervious to viruses since it is isolated from viral attack.

FIG. 6 is a flow-chart of steps taken to download the anti-virus fix using the SP to reconfigure the NIC driver. Initially (block 626), agent 238 polls fix server 106 and determines when and if a fix is needed as described above in FIG. 4 with respect to blocks 415 and 417 (block 627). If the agent 238 in the client computer determines that the anti-virus available at the fix server has not been previously downloaded (query block 630), then the agent informs the user of the client computer that a forced re-boot is imminent (block 632). The SP isolates the client computer from the network by disabling the NIC (block 634), and the SP reboots to pre-boot in the primary (or alternately in the secondary) OS.

The pre-boot in the OS identifies what antiviral action is required (block 638), and then configures the NIC drivers to communicate only with the fix server (block 640). The pre-boot fetches and stages the anti-virus (block 642), and then re-boots in the primary OS (block 644). The primary OS installs the changes causes by the anti-virus (block 646), and the SP puts the client computer back on the full network (blocks 646 and 650).

An embodiment of the invention with an even higher level of security can be implemented by utilizing the "virtual machine monitor" and associated "virtual machine" technologies referred to in the background section. This can be implemented by modifying the virtual machine monitor according to the example given below with reference to FIG. 7. These modifications can be applied to currently available virtualization software executed by CPU 202 out of memory 212, such as the ESX Server software product by VMware Corp. Additionally, for a higher level of security, support for virtualization can be built into any or all of CPU 202, North Bridge 206, and Memory Controller 207. For example, any of these components can be modified to physically block inter-memory access for different virtual machines, contain redundant hardware for virtualization purposes, and provide specialized access including encrypted access to hardware resources. Moreover, it is well known in the art that software components can be readily implemented as hardware and visa-versa. Accordingly, alternative embodiments can include portions of the virtual machine manager itself, which can be implemented in any or all of CPU 202, North Bridge 206, and Memory Controller 207.

Figure 7:
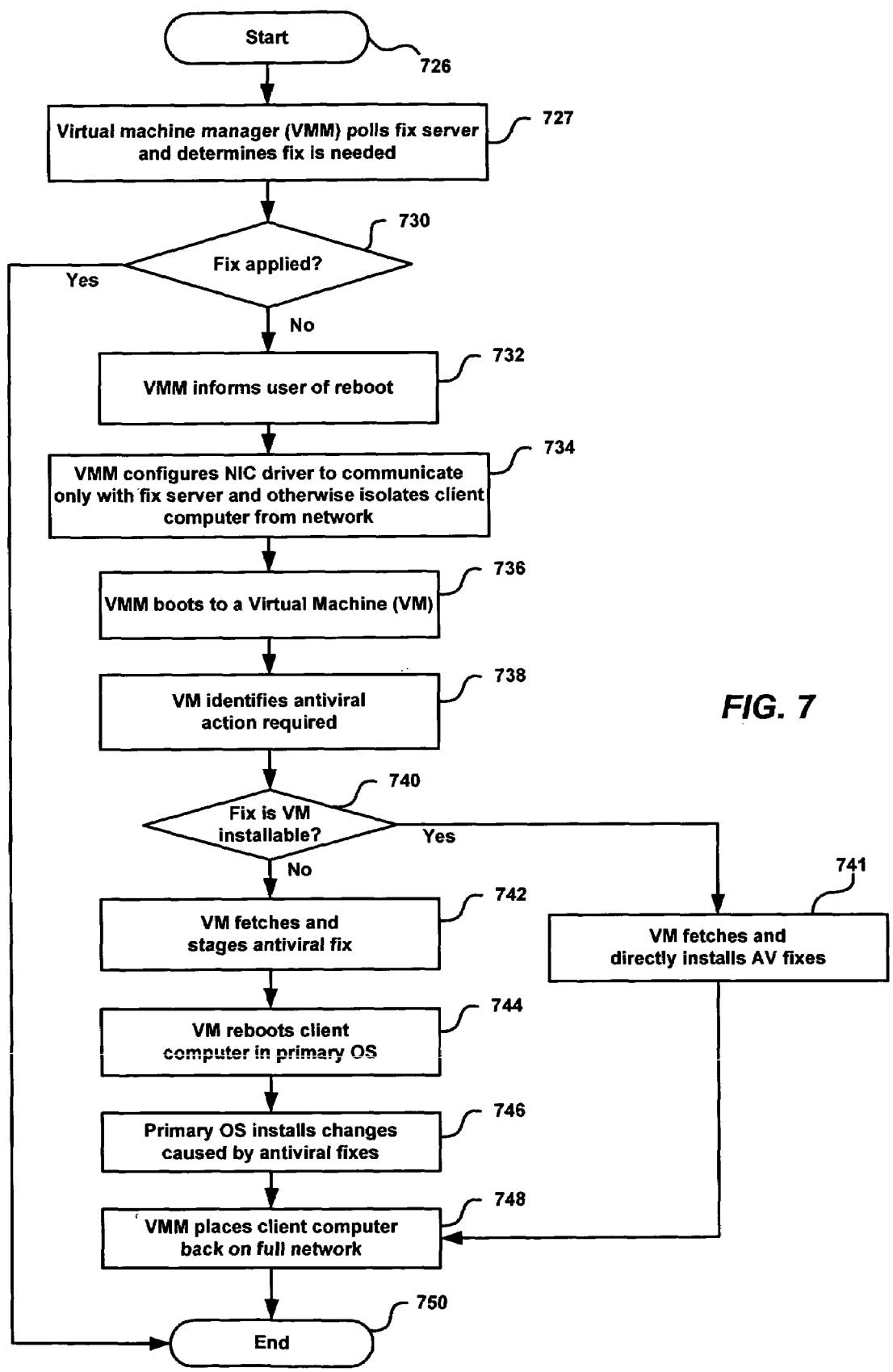
FIG. 7 is a flow-chart of steps taken to download the anti-virus using the VM and VMM to reconfigure the NIC driver.

In the embodiment of FIG. 7 which follows, a virtual machine monitor (VMM), rather than the SP 214 of FIG. 2, can perform the functions described relative to agent 238 in the client computer to query software and memory in client computer 102 to see if the client computer has already installed the downloadable anti-virus fix. If not, the VMM then resets the NIC drivers to communicate only with the fix server and otherwise completely isolates the client computer from the network. That is, the VMM performs the NIC driver setting operation that was performed by the OS's described in FIGS. 4 and 5, but with the use of the VMM and the main processor, both of which are impervious to viruses since they are entirely isolated. Moreover, any of the known methods of network isolation (block 708) can be used including application of a filter or mask to any level of communication code ranging from the driver level all the way to the UDP or TCP/IP level or higher. For example, the filter can be an IP address filter or any like technique which allows the client to only talk to a specific IP address or specific IP addresses which correspond to a single fix server or a plurality of fix servers. The VMM then initiates a virtual machine (VM) with instructions pre-stored in the VMM, and identifies antiviral actions required by the instructions. As an alternative to initiating a VM, the VMM can perpetually maintain an active VM just for this purpose and transfer control to the VM when corrective action is required.

FIG. 7 is a flow-chart of steps taken to download the fix (anti-virus) using the VM and VMM to reconfigure the NIC driver Initially (block 726), the virtual machine manager (VMM) polls fix server 106 and determines when and if a fix is needed as described above in FIG. 4 with respect to blocks 415 and 417 (block 727). If the VMM determines that the anti-virus being offered by the fix server has not been previously downloaded (query block 730), then the VMM informs the user of the client computer that a forced re-boot is imminent (block 732). The VMM then resets the NIC drivers to communicate only with the fix server and otherwise completely isolates the client computer from the network (block 734), and the VMM invokes a VM or transfers control to a perpetual VM as described above.

The VM identifies what antiviral action is required (block 738). If the fixes are directly installable by the VM (or the VMM) (decision block 740), the VM fetches and directly installs the anti-viral fixes (block 741), and the client computer is put back on full line on the network by the VMM (blocks 748 and 750). Otherwise, the VM fetches and stages the anti-virus (block 742), and then re-boots in the primary OS (block 744). The primary OS installs the changes caused by the anti-virus (block 746), and the VMM puts the client computer back on the full network (blocks 748 and 750).

Figure 8:
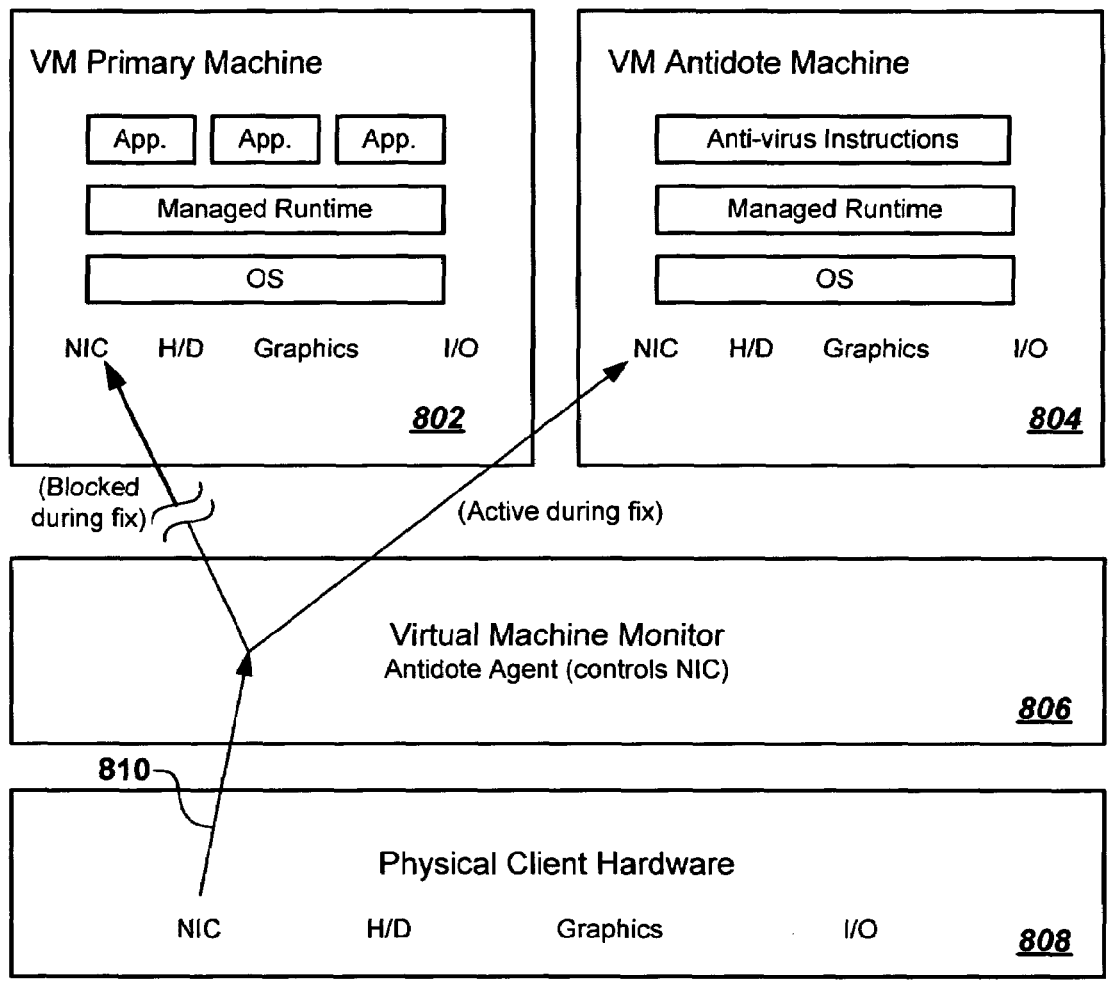
FIG. 8 is a system virtualization layer diagram showing the abstraction layers in a client running virtualitation software which includes a virtual machine monitor.

FIG. 8 is a system virtualization layer diagram showing the abstraction layers in a client running virtualitation software which includes a virtual machine monitor. At the lowest level of abstraction is the hardware layer 808; this is the physical hardware layer of the client machine. A Virtual Machine Monitor layer 806 is an intermediary layer which sits on top of the hardware layer 808 and intercepts all access attempts to the physical hardware by software running on the client machine. It is within the Virtual Machine Monitor layer 806 that the Antidote Agent 238 runs and is executed as part of the virtual machine monitor and as such has all the security and isolation features of the virtual machine monitor. At the highest level of abstraction lie the virtual machines 802 and 804 which ultimately run operating systems and software applications. Virtual machines can be configured so as to know not of the existence of other virtual machines; they can be isolated and autonomous as would be the case for virtual machine 804 which executes the anti-virus instructions provided by and under the control of the Antidote Agent 238 from the Virtual Machine Monitor layer 806. Arrows 810 indicate the isolation of the NIC to virtual machine 802 during a virus fix operation while allowing VM Antidote machine 804 to communicate only with the fix server as described above relative to FIGS. 7a and 7.

Using the VM Antidote Machine 804 under the control of the Antidote Agent running as part of the virtual machine monitor in layer 806 allows for the control and monitoring of all communications present in the client computer, including Modem, WAN, WLAN, Serial Port, USB and other ports. This embodiment is both immune from attack and utilizes the primary CPU 202 and the entire client computer for fix/patch management if desired.

In a preferred embodiment, client computer 102 monitors, using any known system monitoring software and/or hardware, whether client computer 102 can configure the NIC 240 as described above using a primary OS, a secondary OS, a Service Processor, such as SP 214, or a virtual machine manager. That is, if the client computer 102 has a virtual machine manager, then the first choice is to use the virtual machine manager to run the Antidote Agent in a manner described in FIGS. 7-8. If client computer has an SP 214, then the second choice is to use SP 214 to configure NIC 240 in a manner described in FIG. 6. If client computer 214 does not have an SP 214, then the NIC 240 is configured using a secondary (alternate) OS, as described in FIG. 5. Finally, if the client computer 214 does not have an alternate OS, then the NIC 240 is configured as described in FIG. 4.

Embodiments of the present invention include various functions, which have been described above with reference to FIGS. 4-8. The functions may be performed by hardware components or may be embodied in machine-executable instructions, which may be used to cause a general-purpose or special-purpose processor programmed with the instructions to perform the functions. Alternatively, the functions may be performed by a combination of hardware and software.

Figure 9:
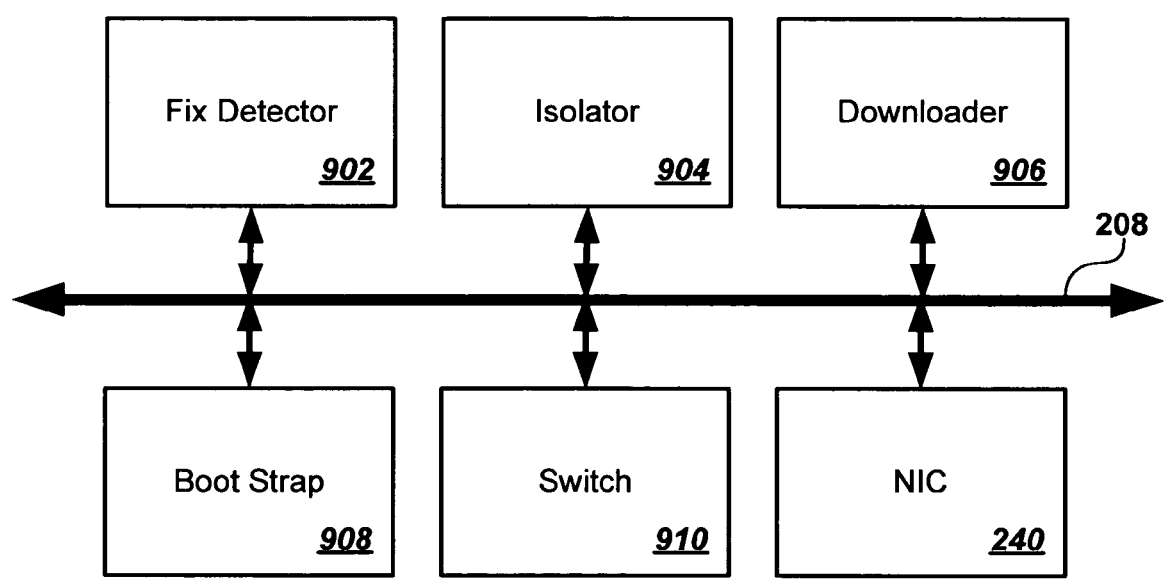
FIG. 9 is a block diagram of an embodiment in which various functions of FIGS. 4-8 are performed in hardware.

FIG. 9 is a block diagram of an embodiment in which various functions of FIGS. 4-8 are performed in hardware. Fix detector 902, Isolator 904, Downloader 906, Boot Strap 908, Switch 910, and NIC 240 (of FIG. 2) are all coupled to the high speed interconnect (PCI) bus 208. Fix detector 902 polls to discern an offer for a software fix from a fix server as described with respect to any of any of the previously described embodiments. Isolator 904 is responsible for controlling and isolating NIC 240 such that communication can only occur with the fix server as described with respect to any of the previous embodiments. Isolator 904 can perform the isolation function according to any of the embodiments previously described. Downloader 906 functions to effect the transfer of the software fix from the fix server to the client computer according to any of the above described embodiments. Boot strap 908 reboots the client computer according to the rebooting of any previous embodiment. Rebooting the client involves rebooting, restarting, or resetting CPU 202. Isolator 904 reconnects the client computer to the network without restrictions after the software fix is loaded and executed. Switch 910 selects the best method according to availability of a primary OS, a secondary OS, a Service Processor, such as SP 214, or a virtual machine manager as described above.

An Embodiment of the present invention may be provided as a computer program product which may include a machine-readable medium having stored thereon instructions which may be used to program a computer (or other electronic devices) to perform a process according to the any of the embodiments of the present invention. The machine-readable medium may include, but is not limited to, floppy diskettes, optical disks, CD-ROMs, and magneto-optical disks, ROMs, RAMs, EPROMs, EEPROMs, magnet or optical cards, or other type of media\machine-readable medium suitable for storing electronic instructions. Moreover, an embodiment of the present invention may also be downloaded as a computer program product, wherein the program may be transferred from a remote computer to a requesting computer by way of data signals embodied in a carrier wave or other propagation medium via a communication link (e.g., a modem or network connection).

The present invention has been described in relation to particular embodiments that are intended in all respects to be illustrative rather than restrictive. Although specific terms are used, the description thus given uses terminology in a generic and descriptive sense only and not for purposes of limitation. Alternative embodiments will become apparent to those skilled in the art to which the present invention pertains without departing from its spirit and scope. Accordingly, the scope of the present invention is defined by the appended claims rather than the foregoing discussion.

We claim as our invention:

1. A method comprising:
   polling a fix server for an available software fix, wherein the polling originates at a client;
   determining whether the client has previously received the software fix;
   isolating the client from a network in response to a determination that the client has not previously received the software fix;
   establishing an exclusive network connection between the client and the fix server;
   receiving the software fix from the fix server; and
   determining whether the client computer has any of a virtual machine manager, a primary operating system, a secondary operating system, and a service processor, and upon said determination,
   utilizing to perform said isolation, the first useful one, in descending priority order, of the virtual machine manager, the primary operating system, the secondary operating system, and the service processor.

2. The method of claim 1 wherein said polling, determination, and isolation are automatically forced on the client without user intervention.

3. The method of claim 2, further comprising:
installing the software fix on the client;
wherein said reception and installation are automatically forced on the client without user intervention.

4. The method of claim 3, further comprising:
reconnecting the client to the network in a full access mode in response to said installation of the software fix.

5. The method of claim 2 wherein said polling is performed according to a predetermined policy.

6. The method of claim 1 wherein the method is under the control of an agent in the client.

7. The method of claim 1, further comprising:
upon receiving the software fix from the fix server, re-booting the client using a secondary operating system in the client.

8. The method of claim 1 wherein said isolation and establishment are performed by a service processor on the client through reconfiguration of a network-interface-card driver.

9. Apparatus comprising:
a fix detector which polls a fix server for an available software fix and determines whether a software fix has previously been received;
an isolator which is operatively coupled to said fix detector and which blocks all existing network traffic on a network interface in response to a determination that a software fix has not previously been received and which establishes an exclusive network connection to the fix server;
a downloader which is operatively coupled to said isolator and which transfers the software fix from the fix server and stages the software fix;
a boot strap which is operatively coupled to said downloader and which initiates a reboot command in response to the software fix being transferred and staged;
wherein said isolator allows unrestricted access on the network in response to an execution of the software fix; and
a switch which is operatively coupled to said fix detector and which determines whether the network interface is controllable using any of a virtual machine monitor, a primary operating system, a secondary operating system, and a service processor, and upon making the determination, utilizing to control the network interface, the first useful one, in descending priority order, of the virtual machine manager, the primary operating system, the secondary operating system, and the service processor.

10. Apparatus of claim 9 wherein said isolator utilizes a primary operating system.

11. Apparatus of claim 9 wherein said isolator and said boot strap utilize a secondary operating system.

12. Apparatus of claim 9 wherein said isolator is a service processor.

13. Apparatus of claim 9 wherein said isolator is a virtual machine monitor implemented in hardware.

14. Apparatus of claim 9 wherein said fix detector is a service processor which includes an agent which makes the determination as to whether a software fix has previously been received.

15. Apparatus of claim 9 wherein said downloader utilizes a secondary operating system to transfer and stage the software fix.

16. Apparatus of claim 9 wherein the software fix is an anti-virus software program.

\* \* \* \* \*